(12) United States Patent
Kim et al.

(10) Patent No.: US 7,064,944 B2
(45) Date of Patent: Jun. 20, 2006

(54) CIRCUIT BREAKER FOR DETECTING OVERLOAD

(75) Inventors: Cheon Yeon Kim, Incheon (KR); Dong Sub Kim, Kyungsan (KR)

(73) Assignee: Seochang Electronic Communication Co., LTD, Daegu (KR)

( * ) Notice: Subject to any disclaimer, the term of this patent is extended or adjusted under 35 U.S.C. 154(b) by 426 days.

(21) Appl. No.: 10/410,785

(22) Filed: Apr. 8, 2003

(65) Prior Publication Data

US 2003/0231449 A1  Dec. 18, 2003

(30) Foreign Application Priority Data

Apr. 9, 2002 (KR) ............. 10-2002-0019226

(51) Int. Cl.
*H02H 9/08* (2006.01)
(52) U.S. Cl. ....................... 361/93.1; 361/42
(58) Field of Classification Search ............... 361/93.7, 361/93.8, 93.9, 42, 43, 44, 45–50, 91.1, 93.1, 361/103
See application file for complete search history.

(56) References Cited

U.S. PATENT DOCUMENTS

| 3,962,606 | A | * | 6/1976 | Burns et al. | 361/45 |
| 5,307,230 | A | * | 4/1994 | MacKenzie | 361/96 |
| 6,577,478 | B1 | * | 6/2003 | Kim et al. | 361/42 |
| 6,590,754 | B1 | * | 7/2003 | Macbeth | 361/42 |
| 6,782,329 | B1 | * | 8/2004 | Scott | 702/58 |

* cited by examiner

*Primary Examiner*—Stephen W. Jackson
*Assistant Examiner*—Danny Nguyen
(74) *Attorney, Agent, or Firm*—Knobbe Martens Olson & Bear LLP

(57) ABSTRACT

A circuit breaker for detecting overload is disclosed. The circuit breaker detects an overload condition electrically without using bimetal. The circuit breaker for detecting overload includes an arc fault detector and a discharge controller. If arc fault occurs, the discharge controller discharges voltage charged in a capacitor. Therefore, the circuit breaker does not trip the circuit when arc fault occurs although high current flows on a conductor. Further, the circuit breaker for detecting overload includes a charging time constant controller so that charging time is varied according to current flowing on the conductor.

16 Claims, 10 Drawing Sheets

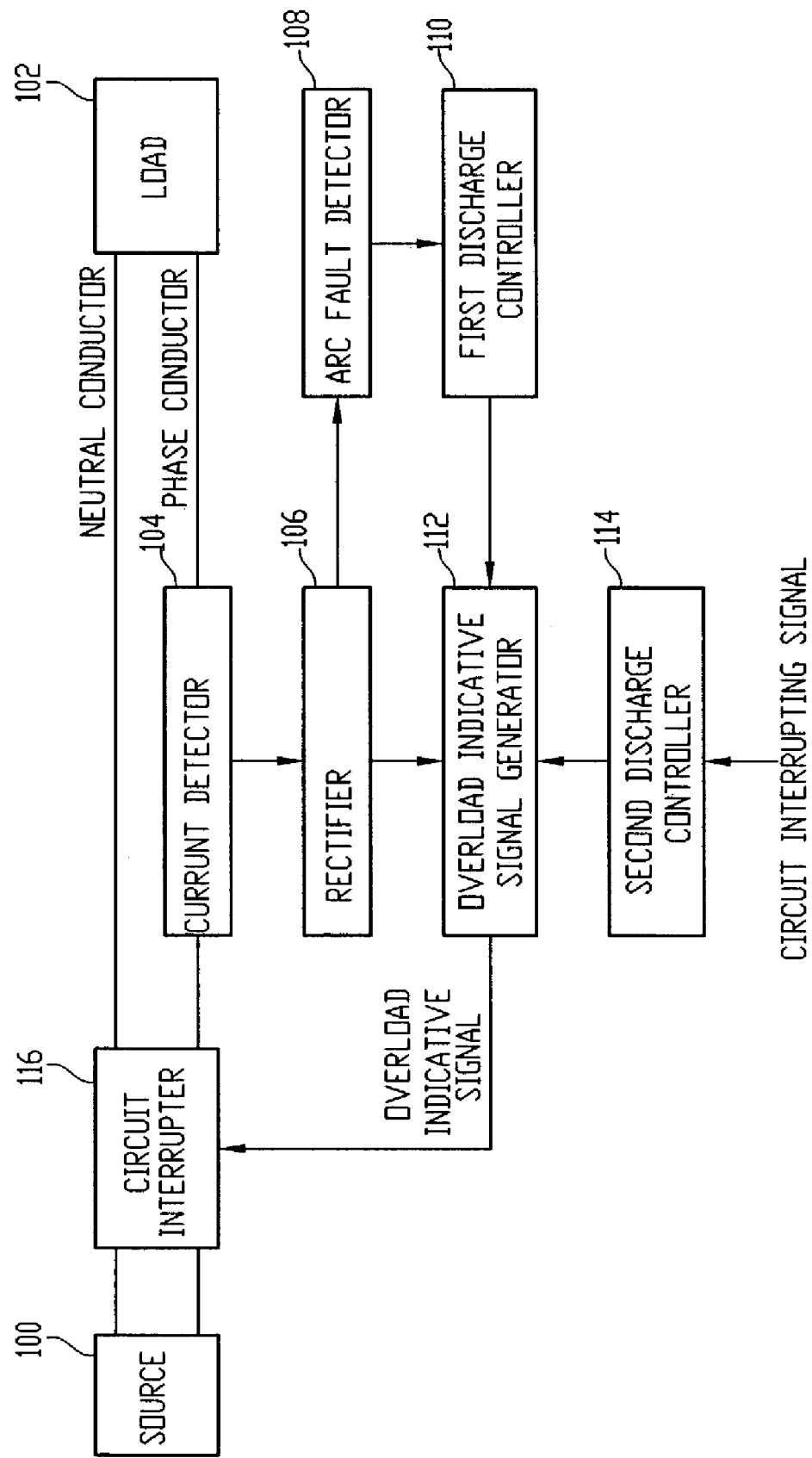

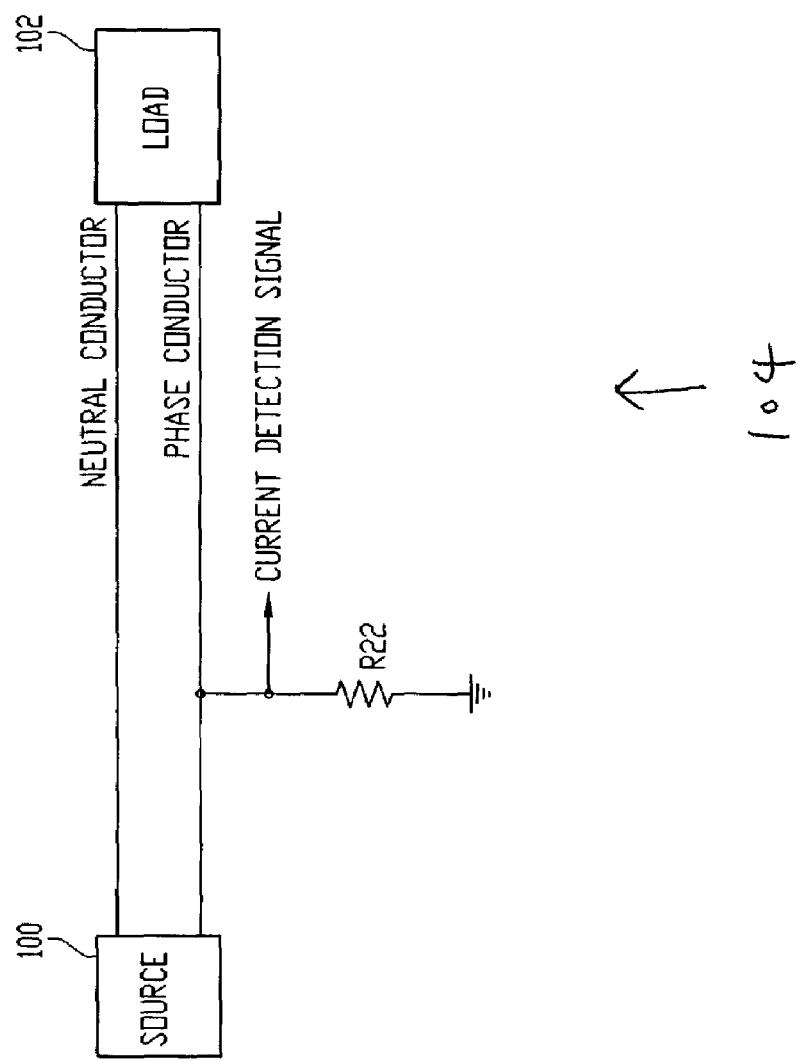

CURRENT DETECTION SIGNAL

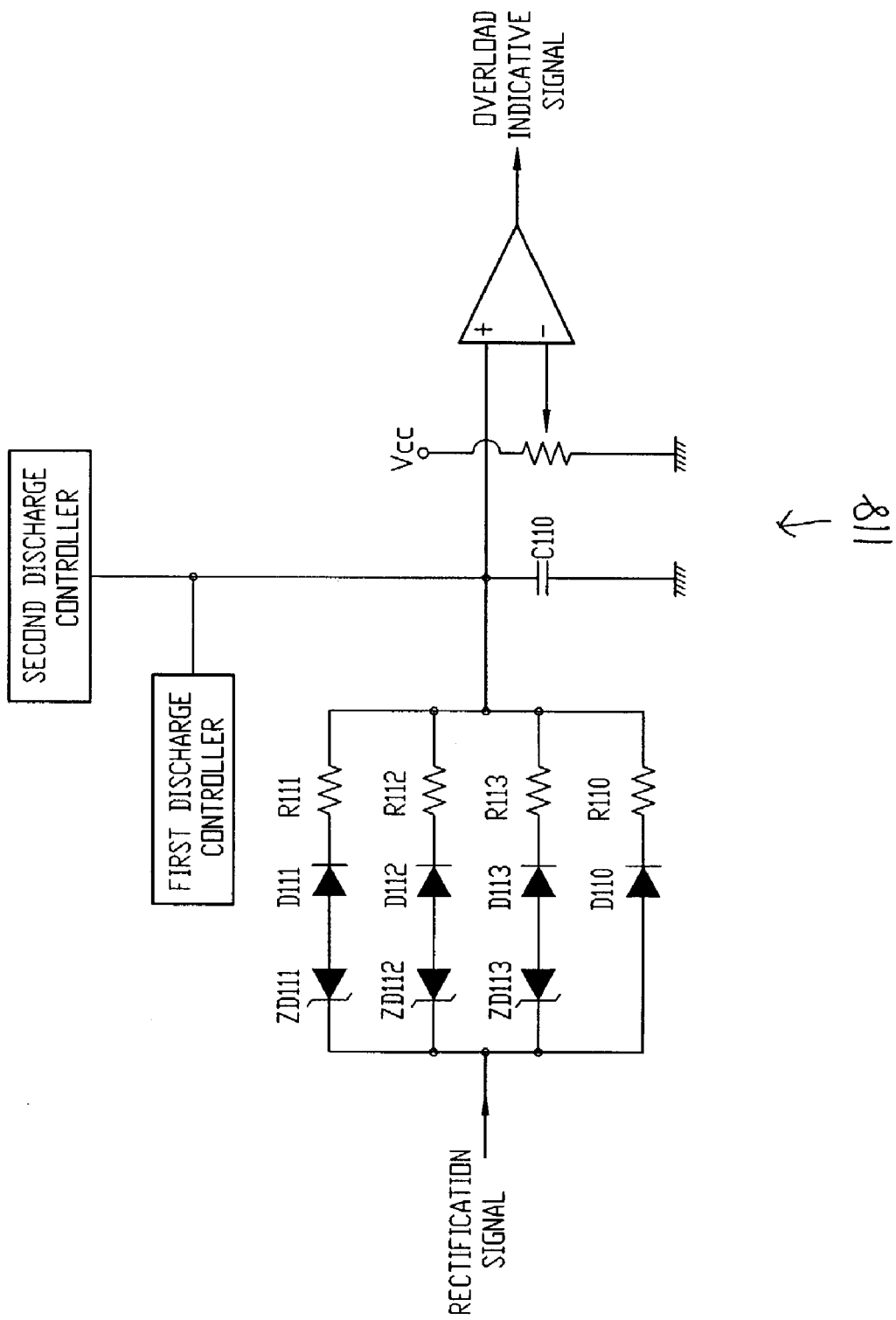

ns generated from arc fault detector.rectifier may include a diode for performing half rectifica# CIRCUIT BREAKER FOR DETECTING OVERLOAD

BACKGROUND OF THE INVENTION

1. Field of the Invention

The present invention relates to a circuit breaker, and more particularly to a circuit breaker for detecting electrical overload to thereby interrupt a circuit providing power from a source to a load when overload occurs.

2. Description of the Related Technology

Generally a wiring circuit breaker and a current leakage circuit breaker are used in a house for prevention of electric shock accidents. The circuit breaker is used for protecting an electric line. In the case where the detected current of a circuit exceeds a reference current level while under a load, current passing through the inside of the circuit is higher than normal and heat is generated. This causes the bimetal element of the circuit breaker to bend and the circuit is interrupted. As a result, an electric source is not provided to a load of an electric device. In this case, because high current occurs instantaneously, heat is applied to the bimetal element so that the magnet of the circuit breaker is operated before the load of an electronic product is operated. Therefore, an electric source is not provided to an electric device. A current leakage circuit breaker functions not only as a circuit breaker but also for sensing an electric shock when a user may be shocked while using an electric device. Therefore, a user is prevented from receiving the electric shock.

A typical circuit breaker has a bimetal element for protecting an electric device from being overloaded. The bimetal is formed from two kinds of metal plates being attached by a rolling method, and the metal plates differ from each other in thermal expansion coefficient. Because the thermal expansion coefficients differ, the bimetal is bent in proportion to a change of temperature. Because this bimetal will bend significantly in proportion to a small change in temperature, it is widely used as a thermometer or a switch for detecting a change of temperature. The bimetal element equipped in a circuit breaker is capable of detecting overload and interrupting a circuit because it bends toward the metal with the low expansion coefficient when an over-current flows. The low expansion coefficient metal used in a bimetal includes an alloy of which the thermal expansion is very small. And, the high-expansion metal includes nickel-chrome-iron alloy, nickel-manganese-iron alloy or manganese-copper-nickel alloy, etc.

Because overload detection using a bimetal must keep detecting the over-current state during a predetermined period, for example, from four minutes to a hour, much time and expenditure is required to design overload detection and for testing the overload detecting circuit. Further, because the bending degree of a bimetal by over-current changes easily according to use over time, the operation characteristics of the overload-protecting circuit will change. Moreover, after the circuit is interrupted by the bending bimetal, the bent bimetal must be returned to its original state. However, much time is required for the bimetal to return to its original shape.

Recently, many circuit breakers have been manufactured as a combination type. The combination type indicates that a circuit breaker detects many kinds of electrical faults such as overload, arc fault and ground fault to thereby interrupt the circuit. Because high current passes through a conduction line when an arc fault occurs, the circuit breaker of this combination type sometimes mistakes the arc for overload. Because the arc fault occurs from a problem in a wiring line, a fire may occur when the circuit is reconnected unless the cause of the fault is identified. However, because overload is generated by a temporary over-current, reconnection of the circuit does not cause a problem after the circuit is interrupted. Therefore, the circuit breaker of the combination type should be able to detect the cause of circuit interruption. However, conventional circuit breakers are not able to precisely distinguish overload from arc fault.

SUMMARY OF CERTAIN INVENTIVE ASPECTS OF THE INVENTION

Embodiments of the present invention have been made to solve the afore-mentioned problems. One aspect of the present invention is to provide a circuit breaker capable of distinguishing exactly overload from an arc.

Another aspect of the present invention is to provide a circuit breaker that discharges voltage charged to an overload-detecting device to thereby distinguish overload from an arc.

In one aspect of the invention, there is provided a circuit breaker for detecting overload which is coupled to a conductor by which power is transmitted from a source to a load and disconnects the conductor when overload is detected, comprising: a current detector for detecting current of the conductor; a rectifier for rectifying a signal outputted from the current detector; an overload indicative signal generator for integrating signal outputted from the rectifier and comparing the integrated signal with a reference signal to thereby output an overload indicative signal; an arc fault detector for analyzing signal outputted from the rectifier to thereby detect whether arc fault occurred; a first discharge controller for discharging the integrated signal of the overload indicative signal generator when an arc detection signal is generated from the arc fault detector.

The current detector may comprise a current transformer for detecting variance of current of the conductor to thereby output a signal that is proportional to the variance of the current The current detector may comprise a shunt circuit for detecting amplitude of current passing through a resistor connected in parallel to the conductor. The current detector may include a Rogowski coil sensor. The rectifier may include four diodes for performing full rectification. The rectifier may include a diode for performing half rectification The overload indicative signal generator may include an integrator for integrating output signal outputted from the rectifier; a reference voltage generator for generating a predetermined reference voltage; and a comparator for comparing the reference voltage with an output voltage of the integrator to thereby generate the overload indicative signal.

The integrator may include a resistor and a capacitor that charges the output signal of the rectifier. The reference voltage generator may include a bias source and at least a resistor for dividing voltage of the bias source.

The comparator includes an OP amp where output signal of the integrator and output signal of the reference voltage generator are inputted.

The arc fault detector may include a filter for passing signal of a predetermined frequency bandwidth from output signal of the rectifier; a level limiter for limiting level of output signal of the filter to a predetermined level when the output signal level of the filter exceeds a predetermined threshold; a reference voltage generator for generating a predetermined reference voltage; and a comparator for comparing output signal of the level limiter with the reference voltage to thereby generate an arc detection signal when the output signal level of the level limiter is higher than the level of the reference voltage, and inputting the arc detection signal to the first discharge controller The filter may be a high-pass filter including a resistor and a capacitor. The level limiter may include a Zener diode.

Further, one embodiment of the present invention may further comprise a second discharge controller for discharging the integrated signal of the overload indicative signal generator when the conductor is interrupted by electrical faults including overload, arc fault and ground fault.

BRIEF DESCRIPTION OF THE DRAWINGS

A full understanding of the invention can be gained from the following description of the embodiments when read in conjunction with the accompanying drawings in which:

FIG. 1 is a block diagram of a circuit breaker for detecting overload according to one embodiment of the present invention.

FIG. 2b illustrates a circuit of the current detector according to another embodiment of the present invention.

FIG. 11 illustrates a circuit of a charging time constant controller according to one embodiment of the present invention.

DETAILED DESCRIPTION OF CERTAIN EMBODIMENTS OF THE INVENTION

Figure 2A:
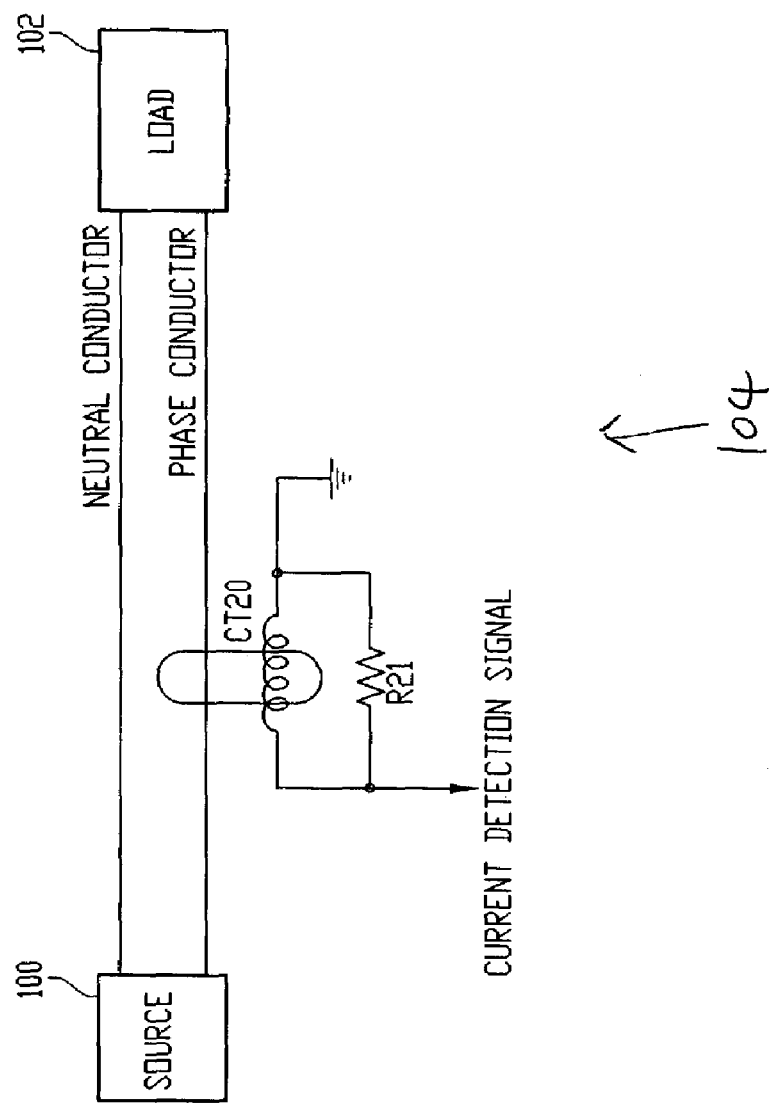
FIG. 2a illustrates a circuit of the current detector according to one embodiment of the present invention.

Hereinafter, the embodiments of the present invention will be explained in more detail with reference to the accompanying drawings.

FIG. 1 is a block diagram of a circuit breaker for detecting overload according to one embodiment of the present invention.

Referring to FIG. 1, the circuit breaker for detecting overload comprises a current detector 104, a rectifier 106, an arc fault detector 108, a first discharge controller 110, an overload indicative signal generator 112, a second discharge controller 114 and a circuit interrupter 116.

FIG. 1 illustrates a block diagram of a circuit breaker directed to a use for detection of overload. However, it would be obvious to those skilled in the art of the present invention can induce easily the fact that detection of overload of one embodiment of the present invention can also be applied to a circuit breaker performing detection of arc defection and detection of ground defection together.

The current detector 104 detects amplitude of current passing from source to load, and outputs a current detection signal proportional to amplitude of current in the form of voltage or current.

A current detector 104 illustrated in FIG. 1 is coupled to a phase conductor so that the current detector 104 detects amplitude of current. However, the current detector 104 may be coupled to both of the phase conductor and the neutral conductor. Otherwise, the current detector 104 may also be coupled to the neutral conductor.

Further, it would be obvious that those skilled in the art of the present invention can induce easily the fact that a current detector 104 can detect amplitude of current directly, and also the current detector 104 can detect amplitude of current by detecting variance of current without detecting amplitude of current directly.

According to one embodiment of the present invention, the current detector 104 may comprise a current transformer.

The current transformer does not detect amplitude of current but detects variance of current. However, because current passing through the conductor is an alternating current (A.C), the variance of current is proportional to amplitude of current. According to another embodiment of the present invention, the current detector 104 can be formed with a shunt circuit that detects amplitude of current passing through a resistor connected in parallel to the conductor.

A rectifier 106 rectifies the current detection signal. The shunt method detecting amplitude of current directly needs rectification-process because current provided from a source to a load is an alternating current (A.C). Also, the current transformer detecting variance of current needs rectification-process because current provided from a source to a load is an alternating current (A.C). The rectifier 106 can be formed with general diodes, and the rectifier 106 of one embodiment of the present invention may perform full rectification or half rectification.

The overload indicative signal generator 112 receives output signal of the rectifier 106 to thereby detect whether to determine occurrence of overload. When overload occurs, the overload indicative signal generator 112 outputs overload indicative signal to thereby interrupt a circuit.

According to one embodiment of the present invention, the overload indicative signal generator 112 integrates continually output signal of the rectifier 106. When the integrated signal exceeds a predetermined level, the overload indicative signal generator 112 outputs an overload indicative signal.

According to one embodiment of the present invention, a capacitor or an analog integration circuit can be used as the integrator that integrates signal outputted from the rectifier 106. According to another embodiment of the present invention, a digital integrator can be used as the integrator. If the digital integrator is used, process for transforming rectification signal into digital signal should be in advance performed.

The arc fault detector 108 analyzes output signal of the rectifier 106 to thereby determine occurrence of arc fault. When the arc fault detector 108 detects occurrence of arc fault, the arc fault detector 108 outputs arc detection signal to the first discharge controller 110.

According to one embodiment of the present invention, it is preferable that the arc fault detector 108 can detect occurrence of an arc without time delay. When arc fault occurs, the circuit breaker for detecting overload in one embodiment of the present invention should not mistake arc for overload. Therefore, if detection of arc is delayed, the overload indicative signal generator 112 integrates signal and outputs the overload indicative signal even when the arc fault occurs. Therefore, the arc fault detector 108 should detect occurrence of arc fault quickly.

If the arc fault detector 108 outputs the arc detection signal, the first discharge controller 110 discharges the integrated signal from the overload indicative signal generator 112. Because the first discharge controller 110 discharges the integrated signal if arc is detected by the arc fault detector 108, it can solve the problem that a circuit for detecting overload mistakes arc for overload.

If the circuit is interrupted by overload, arc fault or ground fault, etc, the second discharge controller 114 discharges the signal integrated in the overload indicative signal generator 112. If the second discharge controller does not discharge the integrated signal, when a user reconnects a circuit, the circuit detects overload again on the state that signal is still integrated in the overload indicative signal generator which may cause incorrect operation of circuit.

If the circuit interrupter 116 receives the overload indicative signal, the circuit interrupter 116 interrupts the circuit so that power is not provided from a source to a load. FIG. 1 illustrates a circuit interrupter 116 connected to a phase conductor to thereby interrupt the phase conductor.

However, it would be obvious that persons skilled in the art of the present invention can induce easily the fact that the circuit interrupter 116 of one embodiment of the present invention can not only interrupt the neutral conductor but also interrupt both of the phase conductor and the neutral conductor.

According to one embodiment of the present invention, in case a circuit interrupter 116 receives an overload indicative signal, the circuit interrupter 116 turns on a solenoid, and changes position of a switch by magnetic signal of the solenoid so that the circuit interrupter 116 can interrupt the circuit.

FIG. 2a is a detailed structure of the current detector 104 according to one embodiment of the present invention. FIG. 2a illustrates a circuit using a current transformer to detect current.

Referring to FIG. 2, a current detector 104 may comprise a coil CT20 and a resistor R21 coupled in parallel to the coil CT20.

The coil CT20 detects a variance of current passing through the phase conductor according to faraday's law, and outputs a current detection signal in proportion to the variance of current. The coil CT20 may be coupled to neutral conductor so that the coil CT20 can detect variance of current unlike FIG. 2a. Because current passing through a phase conductor is an alternating current (A.C), the variance of current is proportional to magnitude of current.

A resistor coupled in parallel to the coil CT20 decreases the signal outputted from the coil CT20, and performs impedance matching. Therefore, the resistor R21 does not affect the essential function of a circuit breaker according to one embodiment of the present invention. When high current passes through the phase conductor and therefore high voltage is applied to the coil CT20, the resistor R21 can restraint instability of a circuit by the high voltage.

Because a coil outputs a voltage proportional to variance of current according to faraday's law, a current detector 104 outputs a current detection signal in type of voltage that the current detector 104 is illustrated to FIG. 2.

FIG. 2b illustrates a circuit of a current detector 104 according to another embodiment of the present invention.

The current detector circuit illustrated in FIG. 2b is a circuit detecting current by a shunt method. The shunt method indicates that current passing through a circuit is separated by a parallel resistor, and the current detection circuit detects amplitude of the separated current to thereby detect amount of current.

Referring to FIG. 2b, a resistor R22 coupled in parallel to the phase conductor plays a part of the parallel resistor. FIG. 2b illustrates a resistor coupled in parallel to the phase conductor. However, it would be obvious that persons skilled in the art of the present invention can induce easily the fact that the resistor may be coupled in parallel to the neutral conductor.

When a resistor is coupled in parallel to a phase conductor, current passes through the parallel resistor according to ratio of intrinsic impedance of the phase conductor and resistance value of the parallel resistor. Therefore, because amplitude of current passing through the parallel resistor is proportional to amplitude of current passing through a phase conductor, the overload can be detected using amplitude of current passing through the parallel resistor.

According to another embodiment of the present invention, the current detector 104 comprises a Rogowski sensor so that the current detection part 104 can output signal proportional to variance of current in the form of voltage.

Figure 3:
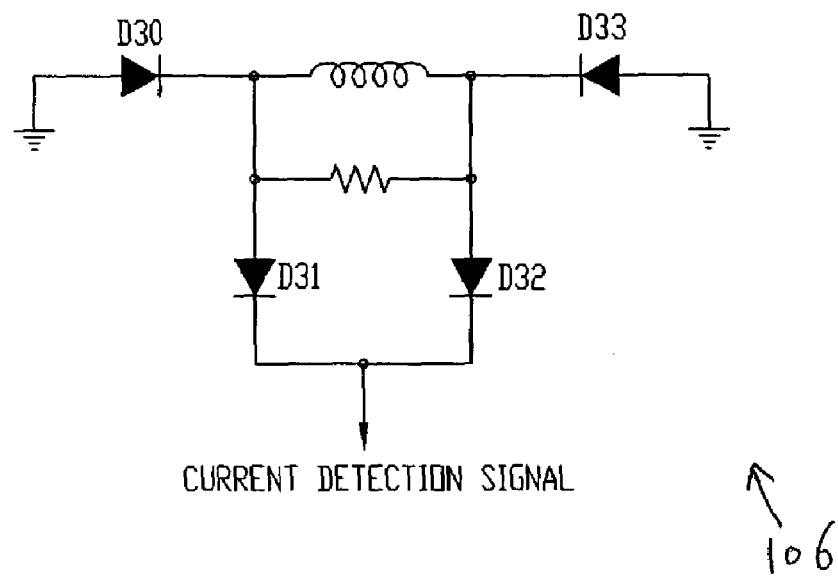
FIG. 3 illustrates a detailed circuit of the rectifier according to one embodiment of the present invention.

FIG. 3 illustrates a detailed circuit of the rectifier according to one embodiment of the present invention.

Referring to FIG. 3, the rectifier 106 comprises four diodes D30, D31, D32, D33. Referring to FIG. 3, two diodes D30, D31 located in left side pass signal having positive value of an alternating current (A.C) signal, two diodes D32, D33 located in right side convert signal having negative value of an alternating current (A.C) signal into signal having positive value to thereby perform full rectification.

FIG. 3 illustrates a rectifier using four diodes to thereby perform full rectification. However, it would be obvious that persons skilled in the art of the present invention can induce easily the fact that one diode may be used as the rectifier to thereby perform half rectification.

Figure 4:
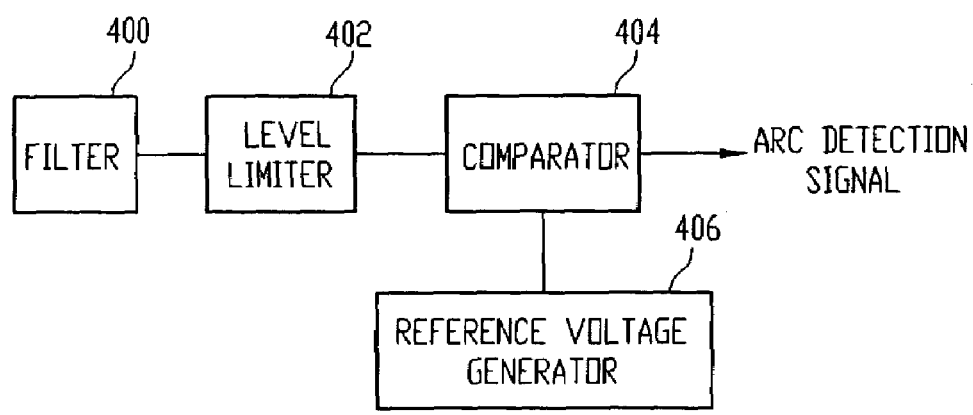
FIG. 4 is a block diagram of the arc fault detector according to one embodiment of the present invention.

FIG. 4 is a block diagram of an arc fault defector according to one embodiment of the present invention.

Referring to FIG. 4, the arc fault detector 108 comprises a filter 400, a level limiter 402, a comparator 404 and a reference voltage generator 406.

The filter 400 may comprise a high-pass filter, and the filter 400 interrupts a low frequency signal that is of no relevance with arc from the output signal of the rectifier 106, and the filter 400 passes only a high frequency signal. Because the filter 400 interrupts low frequency signal, level of signal passing the filter 400 is lower than level of output signal of the rectifier 106. The filter 400 may comprise a capacitor and a resistor.

When signal outputted from the filter 400 exceeds a predetermined reference signal level, the level limiter 402 limits the output signal level of the filter 400 to a predetermined reference signal level. When a current transformer detects a variance of current, output signal of the filter 400 is outputted in the form of voltage, and the level limiter 402 limits level of voltage. According to one embodiment of the present invention, the level limiter 402 may comprise a Zener diode capable of limiting level of voltage. For example, it is assumed that a Zener diode of which the regulation voltage is 27V. When voltage outputted from the filter 400 is 30V, the level limiter 402 limits the output voltage to 27V. This limitation of voltage level is for stability of a circuit.

The reference voltage generator 406 generates a predetermined reference voltage, and inputs the reference voltage into a comparator 404. According to one embodiment of the present invention, the reference voltage generator 406 may comprise a bias electric source and a variable resistor so that the reference voltage generator can output the predetermined voltage. According to another embodiment of the present invention, the reference voltage generator 406 may comprise an independent source.

The comparator 404 compares the signal outputted from the level limiter 402 with the signal outputted from the reference voltage generator 406. In case output signal of the level limiter 402 is higher than level of output voltage of the reference voltage generator 406, the comparator 404 outputs the arc detection signal. According to one embodiment of the present invention, the comparator 404 may comprise an OP amp or an integrated circuit where OP amps are integrated.

The arc detection signal outputted from the comparator 404 is inputted into the first discharge controller 110.

The arc signal is very similar to signal generated when an electric device starts to operate and signal generated by operation of a dimmer. In order to distinguish correctly signal generated when electric device starts to operate from the arc signal, the characteristic that arc signal lasts for a long time may be utilized in one embodiment of the present invention. The output signal of the comparator 404 may be integrated and the arc fault detector of one embodiment of the present invention determines occurrence of arc fault by comparing the integrated value with a reference value.

The above-mentioned arc detection method can distinguish exactly the signal generated when electric device starts to operate from the arc signal. However, because an arc detection part 108 of one embodiment of the present invention should sense quickly generation of an arc without time delay, in one embodiment, the arc detection part 108 compares only variance of current with the predetermined reference value without integration of signal outputted from the comparator 404.

However, FIG. 4 is only one embodiment of the present invention. Therefore, another embodiment of the present invention may comprise an arc fault detector 108 which detects arc fault by integrating output signal of the comparator 404.

Figure 5:
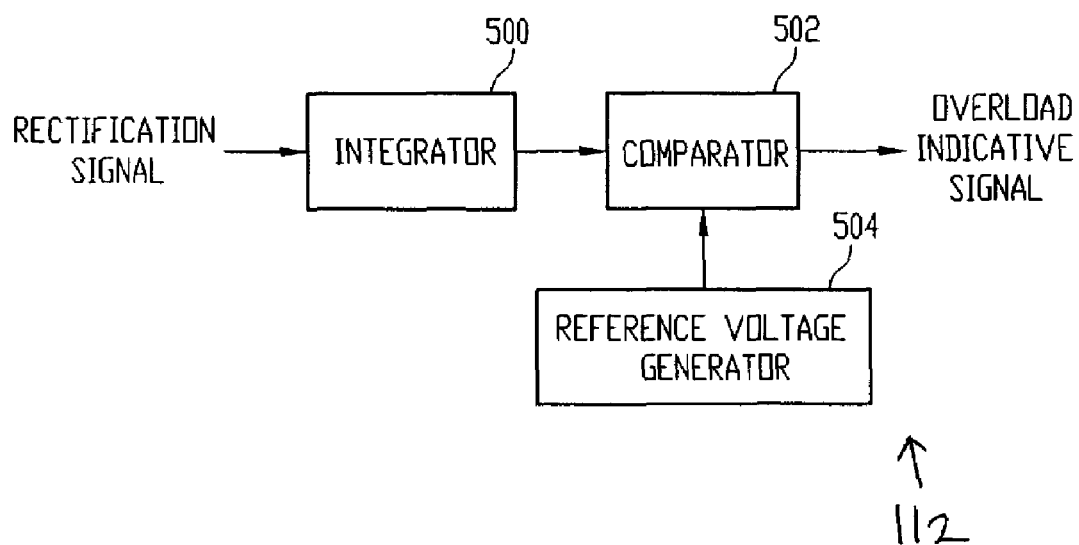
FIG. 5 is a block diagram of the overload indicative signal generator according to one embodiment of the present invention.

FIG. 5 is a block diagram of an overload indicative signal generator 112 according to one embodiment of the present invention.

Referring to FIG. 5, the overload indicative signal generator 112 comprises an integrator 500, a comparator 502 and a reference voltage generator 504.

The integrator 500 integrates continually the rectification signal outputted from the rectifier 106, and inputs the integrated signal into the comparator 502. When normal current passes through a circuit, value integrated in the integrator 500 is small. When overload occurs, value integrated in the integrator 500 is large. According to one embodiment of the present invention, the integrator 500 may comprise an integration circuit comprising a resistor and a capacitor. According to another embodiment of the present invention, when the overload is detected by digital method, the integrator 500 may comprise a digital counter.

The reference voltage generator 504 generates a predetermined reference voltage for determining whether overload occurred or not, and inputs the predetermined reference voltage into the comparator 502. According to one embodiment of the present invention, the reference voltage generator 504 divides bias voltage by using a variable resistor to thereby output the predetermined voltage. According to another embodiment of the present invention, the reference voltage generator 504 may comprise an independent source.

The comparator 502 compares integrated signal with a reference voltage outputted from the reference voltage generator 504. When the level of the integrated signal is higher than the level of the reference voltage, the comparator 502 outputs an overload indicative signal.

According to one embodiment of the present invention, the comparator 504 may comprise an OP amp or an integrated circuit where OP amps are integrated. According to another embodiment of the present invention, when overload is detected by digital method, the comparator 502 may comprise a digital logic circuit.

Figure 6:
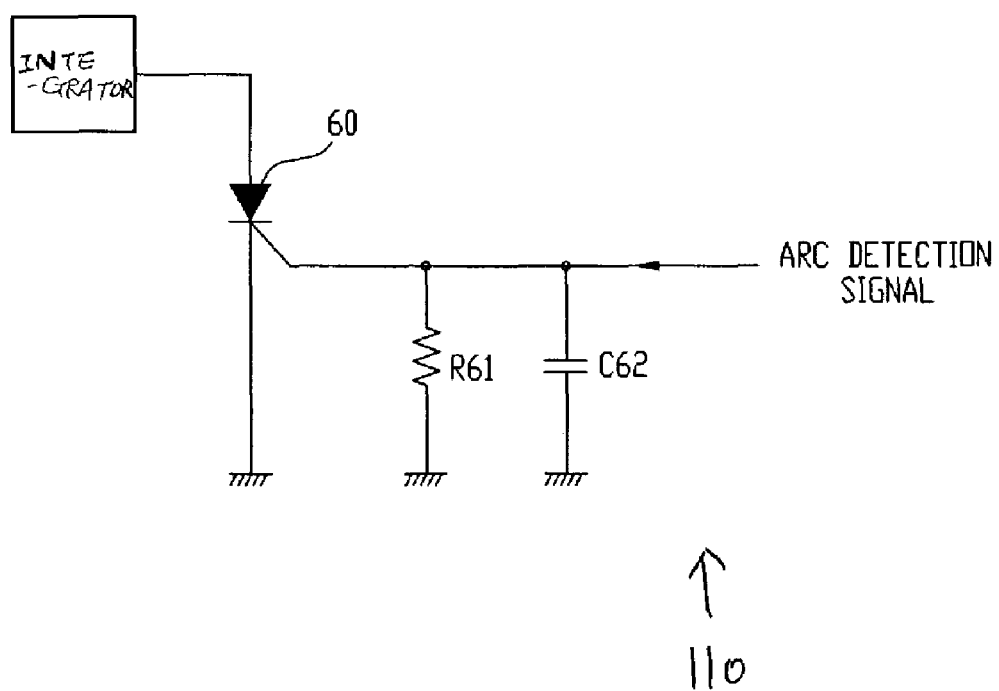
FIG. 6 illustrates a detailed circuit of the first discharge controller according to one embodiment of the present invention.

FIG. 6 illustrates a detailed circuit of the first discharge controller according to one embodiment of the present invention.

When an arc fault occurs, the first discharge controller 110 discharges the integration signal integrated in the overload indicative signal generator 112. When the circuit is interrupted, the second discharge controller 114 discharges the integration signal integrated in an overload indicative signal generator 112. Therefore, the first discharge controller 110 and the second discharge controller 114 may be formed with the same circuit.

Referring to FIG. 6, the first discharge controller 110 comprises a SCR 60, a resistor R61 coupled to a gate terminal of the SCR 60 and a capacitor C62. A cathode terminal of the SCR 60 is coupled to a ground. When the arc detection signal is outputted from the arc fault detector 108, the arc detection signal is inputted to the gate terminal of the SCR 60. The SCR 60 is turned on when voltage is applied to the gate terminal of the SCR 60. The circuit keeps up open state before the SCR 60 is turned on. However, if once the SCR 60 is turned on, the circuit is not open state. Referring to FIG. 6, the anode terminal of the SCR 60 is coupled to the integrator 500 of the overload indicative signal generator 112. When the integrator 500 comprises a capacitor, the anode terminal of a SCR 60 may be coupled to the capacitor.

A resistor R61 and a capacitor C62 coupled to the gate terminal of the SCR 60 are not elements which affect essential function of the circuit but elements for stabilizing the circuit. Therefore, although the resistor R61 and a capacitor C62 are removed, function of the circuit does not change.

When the arc detection signal is inputted to the SCR 60 and the SCR 60 is turned on, the capacitor of the integrator 500 is coupled to a ground to thereby discharge.

Because the first discharge controller 110 discharges the integration voltage integrated in the overload indicative signal generator 112 when the arc detection signal is outputted from the arc fault detector 108, the overload indicative signal generator 112 does not generate the overload indicative signal when an arc fault occurred.

Figure 7:
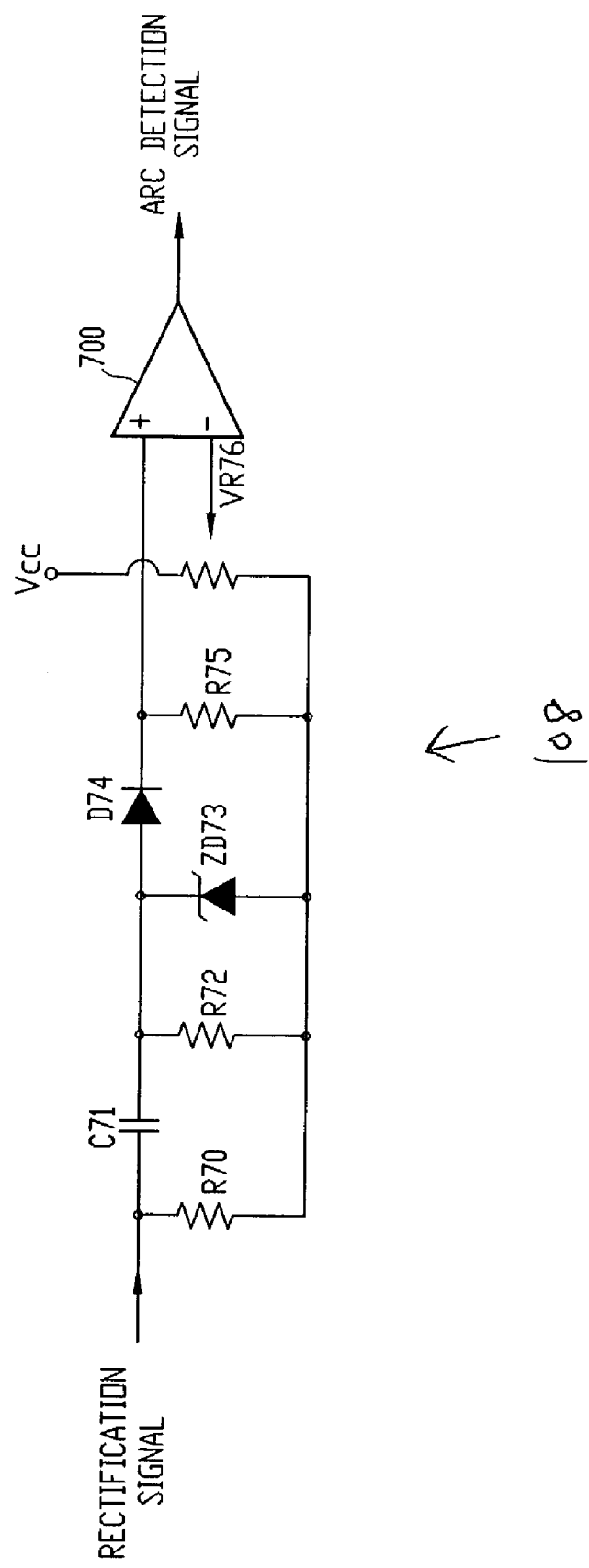
FIG. 7 illustrates a detailed circuit of the arc fault detector according to one embodiment of the present invention.

FIG. 7 illustrates a detailed circuit of the arc fault detector 108 according to one embodiment of the present invention.

Referring to FIG. 7, the filter 400 comprises a resistor R70 and a capacitor C71. Low frequency signal of the rectification signals does not pass through the resistor R70 and the capacitor C71, and only high frequency signal of the rectification signals passes through the resistor R70 and the capacitor C71.

A zener diode ZD73 performs function of a level limiter 402. When signal level outputted from the capacitor C71 is higher than a regulation voltage of the zener diode, the Zener diode ZD73 outputs only voltage corresponding to the regulation voltage of the zener diode ZD73. As mentioned above, when over-voltage is outputted from the current detection part 104, the Zener diode ZD73 limits level of output voltage for stability of circuit. A diode D74 connected to the Zener diode ZD73 prevents backward current.

The signal which passed through the diode D74 is inputted to a non-inverting input terminal of an OP amp 700.

The reference voltage generator comprises a bias voltage Vcc and a variable resistor VR76. A voltage value of appropriate magnitude is set by controlling value of the variable resistor VR76. In FIG. 7 the reference voltage is controlled by using a variable resistor. However, the reference voltage can also be controlled by using two resistors connected in series.

The outputted reference voltage is inputted to an inverting input terminal of the OP amp 700. The OP amp 700 operates as a comparator. Signal that passed through the diode D74 is inputted to the non-inverting input terminal of the OP amp 700. The reference voltage is inputted to the inverting input terminal of the OP amp 700.

When voltage inputted to the non-inverting input terminal of the OP amp 700 is higher than the reference voltage, the OP amp 700 generates output voltage. This output voltage is the arc detection signal and is inputted to the first discharge controller 110. When the first discharge controller 110 is formed with SCR, output voltage of the OP amp turns on SCR to thereby discharge voltage charged in the overload indicative signal generator 112.

Figure 8:
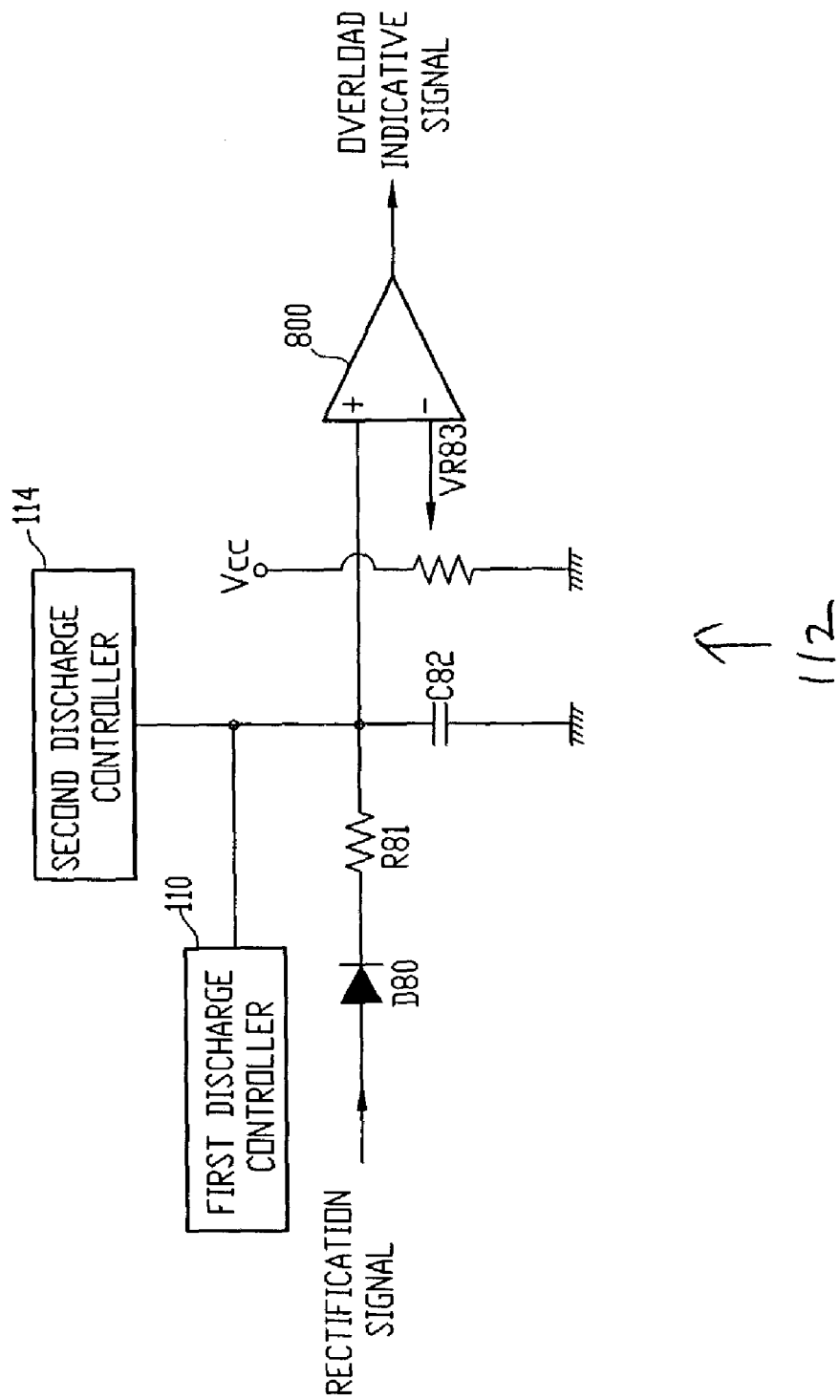
FIG. 8 illustrates a detailed circuit of the overload indicative signal generator according to one embodiment of the present invention.

FIG. 8 illustrates a detailed circuit of the overload indicative signal generator according to one embodiment of the present invention.

The rectification signal outputted from the rectifier 106 is inputted to a diode D80. The diode D80 prevents a backward current like typical diodes.

The resistor R81 coupled in series to the cathode of the diode D80 and a capacitor C82 coupled in parallel to the resistor R81 performs function of the integrator 500. The rectifier 106 outputs a voltage, and the capacitor C82 charges continually the output voltage of the rectifier 106. At this time, charging time is determined by resistance of the resistor R81 and capacitance of the capacitor C82.

Referring to FIG. 8, the capacitor C82 that charges voltage is coupled to the first discharge controller 110 and to the second discharge controller 114.

When the arc detection signal or a circuit-interrupting signal is not outputted, the first discharge controller 110 and the second discharge controller 114 are not coupled to the capacitor. However, when the arc detection signal is outputted, the SCR of the first discharge controller 110 is turned on and the capacitor C82 is coupled to a ground and the charged voltage is discharged. When the circuit-interrupting signal is outputted, a SCR of the second discharge controller 114 is turned on so that the capacitor C82 is connected to a ground and the charged voltage is discharged.

A charged voltage in the capacitor C82 is inputted to the non-inverting input terminal of the OP amp 800.

The reference voltage generator comprises a bias voltage Vcc and a variable resistor VR83. A voltage value of appropriate magnitude is set by controlling value of the variable resistor VR83. In FIG. 8, reference voltage is controlled by using a variable resistor. However, the reference voltage can also be controlled by using two resistors connected in series.

The voltage outputted from the variable resistor VR83 is inputted to the inverting input terminal of the OP amp 800.

The OP amp 800 performs function of the comparison part. When the voltage charged in the capacitor is higher than the reference voltage, the OP amp 800 generates an output voltage. The output voltage is the overload indicative signal and is inputted to the circuit interrupter 116.

Figure 9:
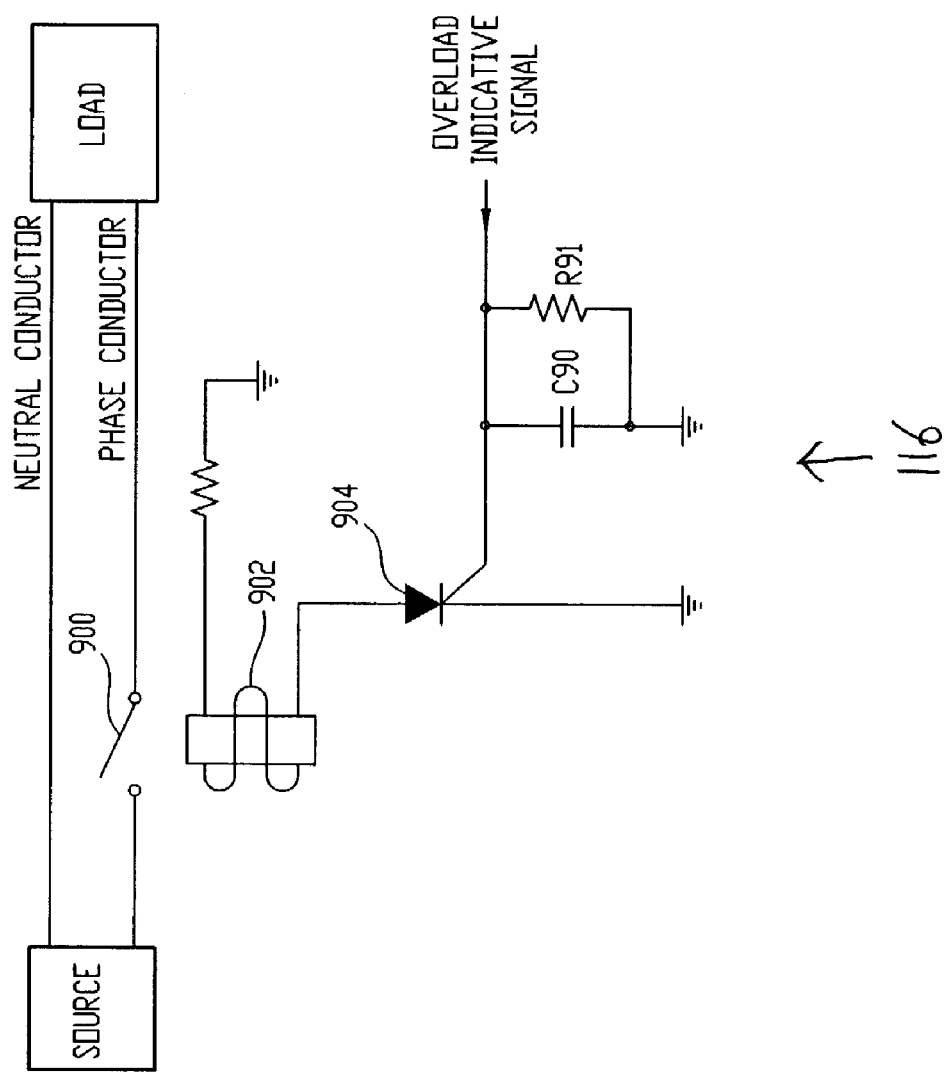
FIG. 9 illustrates a circuit of the circuit interrupter 116 according to one embodiment of the present invention.

FIG. 9 illustrates a detailed circuit of the circuit interrupter according to one embodiment of the present invention.

Referring to FIG. 9, the circuit interrupter 116 comprises a switch 900, a solenoid 902, a SCR 904, a capacitor C90 and a resistor R91. The capacitor C90 and the resistor R91 are coupled to a gate terminal of the SCR 904.

Referring to FIG. 9, when the overload is detected, the overload indicative signal outputted from the overload indicative signal generator 112 is inputted to the gate terminal of the SCR 904. The resistor R91 and the capacitor C90 coupled to the gate terminal of the SCR 904 are not elements which affect the function of the circuit but elements for providing stable signal.

Current does not pass through the SCR 904 in initial condition. However, when voltage applied to the SCR 904 is higher than a regular voltage, current passes through the SCR 904.

Therefore, when the overload indicative signal is not inputted to the gate terminal of the SCR 904, a node where the SCR 904 is coupled is open state, and voltage is not applied to the solenoid 902.

When the overload indicative signal is inputted from the overload indicative signal generator 112, the SCR 904 is turned on, and the overload indicative signal is inputted to the solenoid 902. When current passes through the solenoid 902, the solenoid 902 operates as a magnet. Therefore, position of the switch 900 is moved toward the solenoid 902 side, and a conduction line which connects a source and a load is interrupted.

Figure 10:
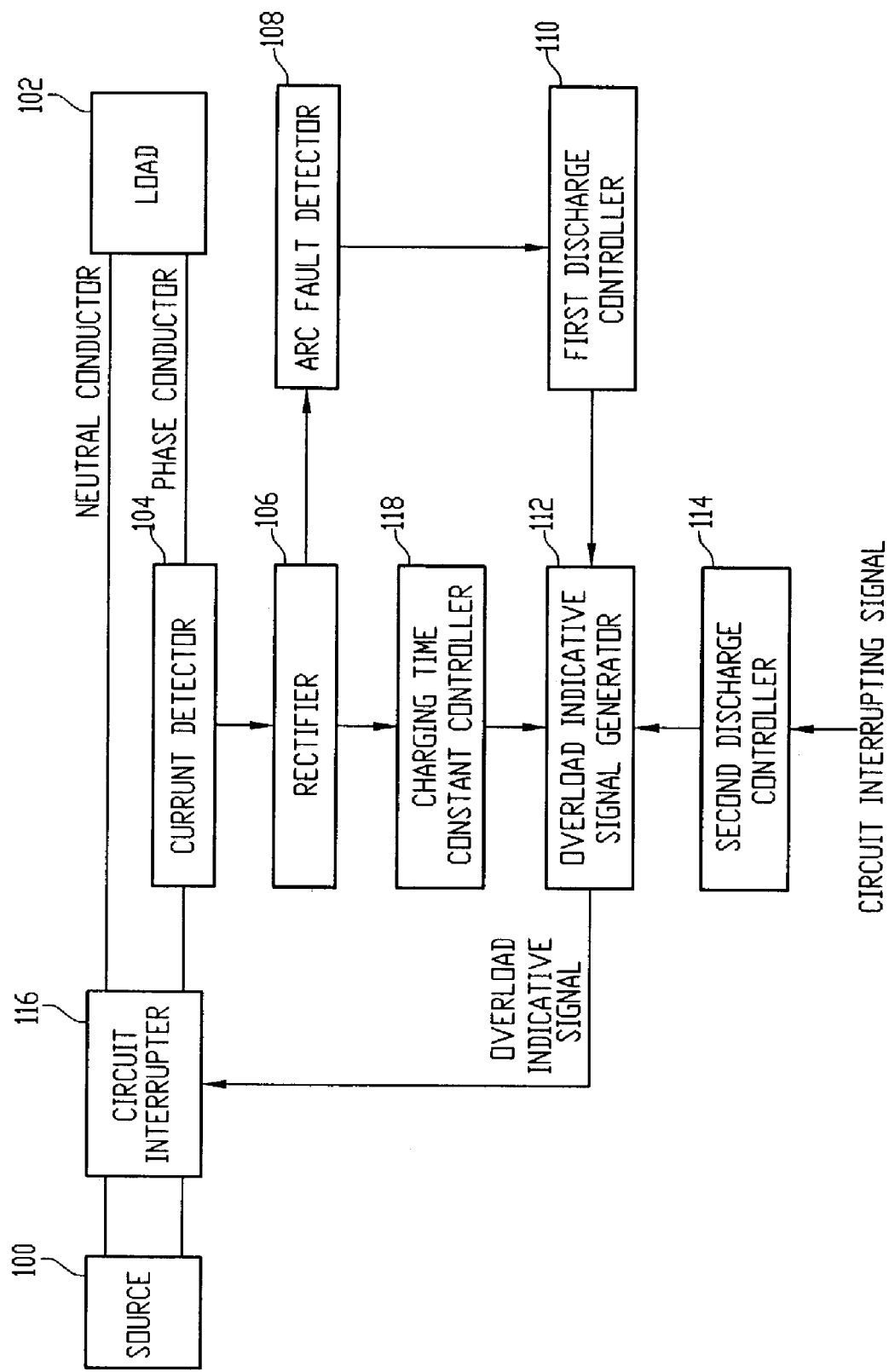
FIG. 10 is a block diagram of a circuit breaker for detecting overload according to another embodiment of the present invention.

FIG. 10 is a block diagram of a circuit breaker for detecting overload according to another embodiment of the present invention.

Referring to FIG. 10, the circuit breaker for detecting overload comprises a current detector 104, a rectifier 106, an arc fault detector 108, a first discharge controller 110, a charging time constant controller 118, an overload indicative signal generator 112, a second discharge controller 114 and a circuit interrupter 116.

The circuit breaker for detecting overload shown in FIG. 10 further comprises the charging time constant controller 118 compared with a circuit breaker for detecting overload shown in FIG. 1. Other elements except for the charge time constant controller 118 have been already described above. Therefore, hereinafter, the charge time constant controller 118 will be described in detail with reference to the accompanying drawings.

The overload indicative signal generator 112 integrates continuously signal outputted from the rectifier 106. When the rectified signal is integrated in the overload indicative signal generator 112, the charge time constant controller 118 makes a charge time constant ($\tau$) change according to amplitude of the rectified signal, so that time for charging the output voltage of the rectifier 106 is changed. According to one embodiment of the present invention, the change of the charge time constant ($\tau$) is controlled by plural resistors connected in parallel with one another and resistance values of the resistors R1, R2, R3, . . . , Rn are different from one another.

FIG. 11 illustrates a detailed circuit of a charge time constant controller 118 according to one embodiment of the present invention.

Referring to FIG. 11, the charge time constant controller 118 comprises three Zner diodes ZD111, ZD112, ZD113, four resistors R111, R112, R113, R110 and four diodes D111, D112, D113, D110. Regular voltages of the Zener diodes are as follows:

ZD111>ZD112>ZD113

On the contrary, the resistance values of the resistors are as follows:

R110>R113>R112>R111

The diodes prevent backward current. For example, regular voltages of the Zener diodes and resistance values of the resistors are set to be as follows:

ZD111=50V, ZD112=40V, ZD113=30V, R111=400 Ω, R112=500 Ω, R113=600 Ω, R110=700 Ω

A reference voltage outputted from a reference voltage generator 504 is set to be 30V. A charge time constant (τ) of a circuit that comprises a resistor and a capacitor is as follows: T=R(resistance value of a resistor)*C(capacitance of a capacitor)

For example, in case output voltage of the rectifier 106 is 43V, voltage is applied to three resistors R112, R113, R110, and no voltage is applied to one resistor R111 because a regular voltage of a zener diode ZD111 is 50V. A resistance value of the resistor R112 is the smallest among three resistors R112, R113, R110. Therefore, a charge time constant (τ) by the resistor R112 (R112*C110) is the smallest among a charge time constant (τ) of by three resistor R112, R113, R110 (R112*C110, R113*C110, R110*C110). Therefore, when the rectification signal is integrated in the overload indicative signal generator 112, time for integrating is decided by the charging time constant (τ) of the resistor R112 (R112*C110). When integrated signal level in the overload indicative signal generator 112 exceeds 30V, the overload indicative signal generator 112 generates the overload indicative signal.

For another example, in case output voltage of the rectifier 106 is 33V, voltage is applied to two resistors R113, R110, and no voltage is applied to two resistors R111, R112 because a regular voltage of the Zener diode ZD111 is 50V and a regular voltage of the Zener diode ZD112 is 40V. Resistance value of the resistor R113 is smaller than resistance value of the resistor R110. Therefore, a charging time constant (τ) by the resistor R113 (R113*C110) is smaller than a charge time constant (τ) by the resistor R110 (R110*C110). Therefore, when the rectification signal is integrated in the overload indicative signal generator 112, time for integrating is decided by the charge time constant (τ) by the resistor R113. When integrated signal level in the overload indicative signal generator 112 exceeds 30V, the overload indicative signal generator 112 generates an overload indicative signal.

The larger the output voltage of the rectifier 106 is, the smaller a charge time constant (τ) becomes. In other words, the larger the output voltage of the rectifier 106 is, the faster output signal of the rectifier 106 is integrated in the overload indicative signal generator 112. Because the circuit is interrupted when a value integrated in the overload indicative signal generator 112 exceeds the reference voltage outputted from the reference voltage generator 504, the larger the output voltage of the rectifier 106 is, the more a circuit is interrupted rapidly.

FIG. 11 shows a circuit of the charge time constant controller 118 that comprises three Zener diodes, four diodes and four resistors. However, it would be obvious to those skilled in the art that the number of Zener diodes, diodes and resistors can be changed in various ways.

As described above, because the charge time constant controller 118 controls a charging time constant (τ), time for interrupting the circuit is changed according to an output voltage of a rectifier when overload is detected.

As described above, according to one embodiment of the present invention, the overload indicative signal generator does not charge voltage when arc fault has occurred. Therefore, the problem that circuit is interrupted for overload although arc fault has occurred can be solved.

Further, as the circuit breaker for detecting overload of one embodiment of the present invention can distinguish correctly arc from overload, the possibility of fire can be decreased when a user reconnects circuit.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A circuit breaker for detecting overload of a circuit, comprising:
    a current detector configured to detect current flowing through a conductor and to output a current detection signal, the conductor being configured to electrically connect a source and a load in the circuit;
    a rectifier configured to rectify the current detection signal and to output a rectified signal;
    an overload indicative signal generator configured to integrate the rectified signal and to generate an overload indicative signal based on the rectified signal;
    an arc fault detector configured to detect whether an arc fault has occurred in the circuit based on the rectified signal; and
    a first discharge controller configured to control the overload indicative signal generator based on the detected arc fault such that the integrated signal is discharged,
    wherein the overload indicative signal generator comprises:
    an integrator configured to integrate the rectified signal, wherein the integrator comprises a resistor and a capacitor that is charged with the rectified signal;
    a reference voltage generator configured to generate a predetermined reference voltage; and
    a comparator configured to compare the reference voltage with the integrated signal to thereby generate the overload indicative signal,
    and wherein the first discharge controller comprises a silicon controlled rectifier (SCR) turned on when the arc detection signal is input to the gate terminal of the SCR so that the capacitor is coupled to the ground.

2. The circuit breaker of claim 1, wherein the current detector comprises a current transformer configured to detect variance of current of the conductor to thereby output a signal that is proportional to the variance of the current.

3. The circuit breaker of claim 1, wherein the current detector comprises a shunt circuit configured to detect amplitude of current passing through a resistor connected in parallel to the conductor.

4. The circuit breaker of claim 1, wherein the current detector comprises a Rogowski coil sensor.

5. The circuit breaker of claim 1, wherein the rectifier comprises four diodes configured to perform a full rectification.

6. The circuit breaker of claim 1, wherein the rectifier comprises a diode configured to perform a half rectification.

7. The circuit breaker of claim 1, wherein the reference voltage generator comprises a bias source and at least a resistor for dividing voltage of the bias source.

8. The circuit breaker of claim 1, wherein the comparator comprises an op-amp configured to receive the integrated signal and the predetermined reference voltage.

9. The circuit breaker of claim 1, wherein the arc fault detector comprises:
   a filter configured to pass a signal of a predetermined frequency bandwidth from the rectified signal;
   a level limiter configured to limit the level of the filtered signal to a predetermined level when the level of the filtered signal exceeds a predetermined threshold;
   a reference voltage generator configured to generate a predetermined reference voltage; and
   a comparator configured to compare the output signal of the level limiter with the predetermined reference voltage to thereby generate an arc detection signal when the level of the output signal of the level limiter is higher than the level of the reference voltage.

10. The circuit breaker of claim 9, wherein the filter comprises a high-pass filter including a resistor and a capacitor.

11. The circuit breaker of claim 9, wherein the level limiter comprises a Zener diode.

12. The circuit breaker of claim 9, wherein the reference voltage generator comprises a bias source and at least a resistor for dividing voltage of the bias source.

13. The circuit breaker of claim 9, wherein the comparator comprises an op-amp configured to receive the output signal of the level limiter and the output signal of the reference voltage generator.

14. The circuit breaker of claim 1, further comprising a circuit interrupter being configured to break the circuit based on the overload indicative signal.

15. A circuit breaker for detecting overload of a circuit, comprising:
   a current detector configured to detect current flowing through a conductor and to output a current detection signal, the conductor being configured to electrically connect a source and a load in the circuit;
   a rectifier configured to rectify the current detection signal and to output a rectified signal;
   an overload indicative signal generator configured to integrate the rectified signal and to generate an overload indicative signal based on the rectified signal;
   an arc fault detector configured to detect whether an arc fault has occurred in the circuit based on the rectified signal;
   a first discharge controller configured to control the overload indicative signal generator based on the detected arc fault such that the integrated signal is discharged; and
   a second discharge controller configured to discharge the integrated signal when the conductor is interrupted by electrical faults including an overload, an arc fault and a ground fault.

16. A circuit breaker for detecting overload of a circuit, comprising:
   a current detector configured to detect current flowing through a conductor and to output a current detection signal, the conductor being configured to electrically connect a source and a load in the circuit;
   a rectifier configured to rectify the current detection signal and to output a rectified signal;
   an overload indicative signal generator configured to integrate the rectified signal and to generate an overload indicative signal based on the rectified signal;
   an arc fault detector configured to detect whether an arc fault has occurred in the circuit based on the rectified signal;
   a first discharge controller configured to control the overload indicative signal generator based on the detected arc fault such that the integrated signal is discharged; and
   a charging time constant controller configured to change a charging time constant according to an amplitude of the rectified signal,
   wherein the charge time constant controller comprises a plurality of Zener diodes connected in parallel with one another and resistors.

* * * * *